(12) United States Patent
Imison et al.

(10) Patent No.: US 8,980,357 B2
(45) Date of Patent: Mar. 17, 2015

(54) FOAMING COMPOSITIONS AND METHODS OF MAKING THE SAME

(75) Inventors: Thomas Philip Imison, Banbury (GB);
Philip James Oxford, Chicago, IL (US);
Stefano Ceriali, Kingham (GB); Bary Lyn Zeller, Glenview, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 776 days.

(21) Appl. No.: 11/943,758

(22) Filed: Nov. 21, 2007

(65) Prior Publication Data

US 2008/0160139 A1    Jul. 3, 2008

Related U.S. Application Data

(60) Provisional application No. 60/882,738, filed on Dec. 29, 2006.

(51) Int. Cl.
*A23P 1/16* (2006.01)
*A23L 1/48* (2006.01)
(Continued)

(52) U.S. Cl.
CPC ... *A23P 1/16* (2013.01); *A23F 5/42* (2013.01); *A23L 1/39* (2013.01); *A23L 1/0097* (2013.01); *A23L 2/54* (2013.01)
USPC ............................... 426/564; 426/89; 426/96

(58) Field of Classification Search
CPC . A23L 1/0029; A23L 1/0097; A23L 1/22016; A23L 2/54; A23F 5/42; A23G 9/44; A23V 2002/00; A23V 2200/226
USPC ............................................. 426/564, 96, 89
See application file for complete search history.

(56) References Cited

U.S. PATENT DOCUMENTS 4,282,263 A * 8/1981 Barnes et al. ................. 426/572
5,750,178 A * 5/1998 Cheng et al. .................. 426/594
(Continued)

FOREIGN PATENT DOCUMENTS

CN      1377233      10/2002
EP      1 557 091 A1   7/2005
(Continued)

OTHER PUBLICATIONS

CO2 phase diagram found on the internet at: http://www.teamonslaught.fsnet.co.uk/co2%20phase%20diagram.GIF.*
(Continued)

*Primary Examiner* — Donald Tarazano
*Assistant Examiner* — Jerry W Anderson
(74) *Attorney, Agent, or Firm* — Fitch, Even, Tabin & Flannery LLP

(57) ABSTRACT

A foaming composition is provided comprising a particulate ingredient having a plurality of internal voids containing entrapped supercritical fluid having a critical temperature of at least about 10° C. Additionally, a method is provided for preparing such a foaming composition. A supercritical fluid having a critical temperature of at least about 10° C. is contacted with a particulate ingredient having a glass transition temperature above ambient temperature at a temperature above the glass transition temperature of the particulate ingredient, wherein the particulate ingredient comprises a plurality of internal voids. The particulate ingredient is held at the temperature above the glass transition temperature of the particulate ingredient for a period of time effective to allow transfer of the supercritical fluid into the plurality of internal voids of the particulate ingredient. Subsequently, the temperature is reduced to below the glass transition temperature of the particulate ingredient, thereby entrapping at least a portion of the supercritical fluid in the plurality of internal voids of the particulate ingredient.

21 Claims, 3 Drawing Sheets

(51) Int. Cl.
*A23F 5/42* (2006.01)
*A23L 1/39* (2006.01)
*A23L 1/00* (2006.01)
*A23L 2/54* (2006.01)

(56) References Cited

U.S. PATENT DOCUMENTS

| | | | |
|---|---|---|---|
| 6,713,113 B2 * | 3/2004 | Bisperink et al. | 426/564 |
| 2006/0040023 A1 | 2/2006 | Zeller et al. | |
| 2006/0040033 A1 * | 2/2006 | Zeller | 426/564 |
| 2006/0040034 A1 * | 2/2006 | Zeller et al. | 426/564 |

FOREIGN PATENT DOCUMENTS

| | | |
|---|---|---|
| JP | 59-151863 A | 8/1984 |
| JP | 62-171646 A | 7/1987 |
| WO | 01-08504 | 2/2001 |
| WO | 2002/062152 A1 | 8/2002 |
| WO | 2004/019699 A1 | 3/2004 |
| WO | 2006/023564 A1 | 3/2006 |
| WO | 2006/023565 A1 | 3/2006 |

OTHER PUBLICATIONS

Mamata Mukhopadhyay, Natural Extracts Using Supercritical Carbon Dioxide, p. 13 (2000).

Andrew Cooper et al., Polymer Synthesis and Characterization in Liquid/Supercritical Carbon Dioxide, Current Opinion in Solid State and Materials Science, 1:761-768 (1996).

Flavor, Fragrance, and Odor Analysis, p. 6, 158 (Ray Marsili ed. 2002).

* cited by examiner

US 8,980,357 B2

FOAMING COMPOSITIONS AND METHODS OF MAKING THE SAME

RELATED APPLICATIONS

The present application is based on, and claims the benefit of, U.S. Provisional Application 60/882,738, filed on Dec. 29, 2006, which is hereby incorporated by reference.

FIELD OF THE INVENTION

The present invention is directed to foaming compositions, and in particular, to soluble foaming compositions comprising an entrapped supercritical fluid, and methods for making the same.

BACKGROUND OF THE INVENTION

A number of conventionally prepared food items, for example, cappuccino, milk shakes, and certain soups, desirably include froth or foam. In order to accommodate an increasing demand for the convenience of consumer prepared instant food alternatives, manufactures have developed a variety of instant food products which give consumers the food products they desire from a convenient instant food product having the same or similar characteristics as conventionally prepared food items. One challenge for manufacturers is how to produce an instant food product having a desirable froth or foam.

One technique used to manufacture an instant food product with foam is through the use of powdered foaming compositions that produce foam upon reconstitution in a liquid. Foaming powder compositions have been used to impart froth or foamed texture to a wide variety of foods and beverages. For example, foaming compositions have been used to impart froth or foamed texture to instant cappuccino and other coffee mixes, instant refreshing beverage mixes, instant soup mixes, instant milkshake mixes, instant dessert toppings, instant sauces, hot or cold cereals, and the like, when combined with water, milk, or other suitable liquid.

Some examples of gas-injected foaming creamers which can be used to impart foam or froth are disclosed in U.S. Pat. No. 4,438,147 and in EP 0 458 310. More recently, U.S. Pat. No. 6,129,943 discloses a foaming creamer produced by combining a gasified carbohydrate with protein and lipid. Using this technology, it was possible to eliminate gas injection of the liquid creamer composition prior to spray drying.

EP 0 813 815 B1 discloses a foaming creamer composition which is either a gas-injected foaming creamer or a creamer containing chemical carbonation ingredients which contains in excess of 20% protein by weight. The powder described has, as essential ingredients, protein, lipid and filler material, the filler especially being a water-soluble carbohydrate. The high content of protein is needed to obtain a whipped cream-like, tight foam having spoonability.

Another foaming composition is described in U.S. Pat. No. 6,713,113 which discloses a powdered soluble foaming ingredient comprising a matrix containing carbohydrate, protein, and entrapped pressurized gas. However, powdered ingredients containing both carbohydrate and protein are susceptible to nonoxidative browning reactions that can adversely affect the appearance, flavor, and shelf life of packaged food products. These complex chemical reactions occur between proteins and carbohydrates, especially reducing sugars, to form polymeric pigments that can severely discolor and diminish the flavor quality of food products. U.S. Patent App. Publication Nos. 2006/0040033 and 2006/0040034 describe non-carbohydrate foaming compositions and non-protein foaming compositions, respectively, which provide resistance to undesirable browning and impaired flavor quality.

Disadvantages of existing foaming compositions and the manufacturing methods thereof include the relatively long processing times required to introduce the gas into the structure of the foaming composition and the high raw material costs resulting from wasted gas and other materials. Thus, there remains a need for foaming compositions for use in instant food and beverage products that exhibit desirable foaming characteristics upon reconstitution and that may be prepared by methods that desirably reduce processing times and raw material costs. The present invention provides these and other benefits, as will be apparent from the following description of embodiments of the present invention.

SUMMARY OF THE INVENTION

Accordingly, in one aspect, the present invention provides a method for preparing a foaming composition comprising contacting a supercritical fluid having a critical temperature of at least about 10° C. with a particulate ingredient having a glass transition temperature above ambient temperature at a temperature above the glass transition temperature of the particulate ingredient, wherein the particulate ingredient comprises a plurality of internal voids; holding the particulate ingredient at the temperature above the glass transition temperature of the particulate ingredient for a period of time effective to allow transfer of the supercritical fluid into the plurality of internal voids of the particulate ingredient; and reducing the temperature to below the glass transition temperature of the particulate ingredient, thereby entrapping at least a portion of the supercritical fluid in the plurality of internal voids of the particulate ingredient.

According to another aspect of the invention, a foaming composition is provided comprising a particulate ingredient having a plurality of internal voids containing entrapped supercritical fluid having a critical temperature of at least about 10° C.

According to yet another aspect, the invention provides a foaming composition prepared by a method comprising contacting a supercritical fluid having a critical temperature of at least about 10° C. with a particulate ingredient having a glass transition temperature above ambient temperature at a temperature above the glass transition temperature of the particulate ingredient, wherein the particulate ingredient comprises a plurality of internal voids; holding the particulate ingredient at the temperature above the glass transition temperature of the particulate ingredient for a period of time effective to allow transfer of the supercritical fluid into the plurality of internal voids of the particulate ingredient; and reducing the temperature to below the glass transition temperature of the particulate ingredient, thereby entrapping at least a portion of the supercritical fluid in the particulate ingredient.

DETAILED DESCRIPTION

Figure 1:
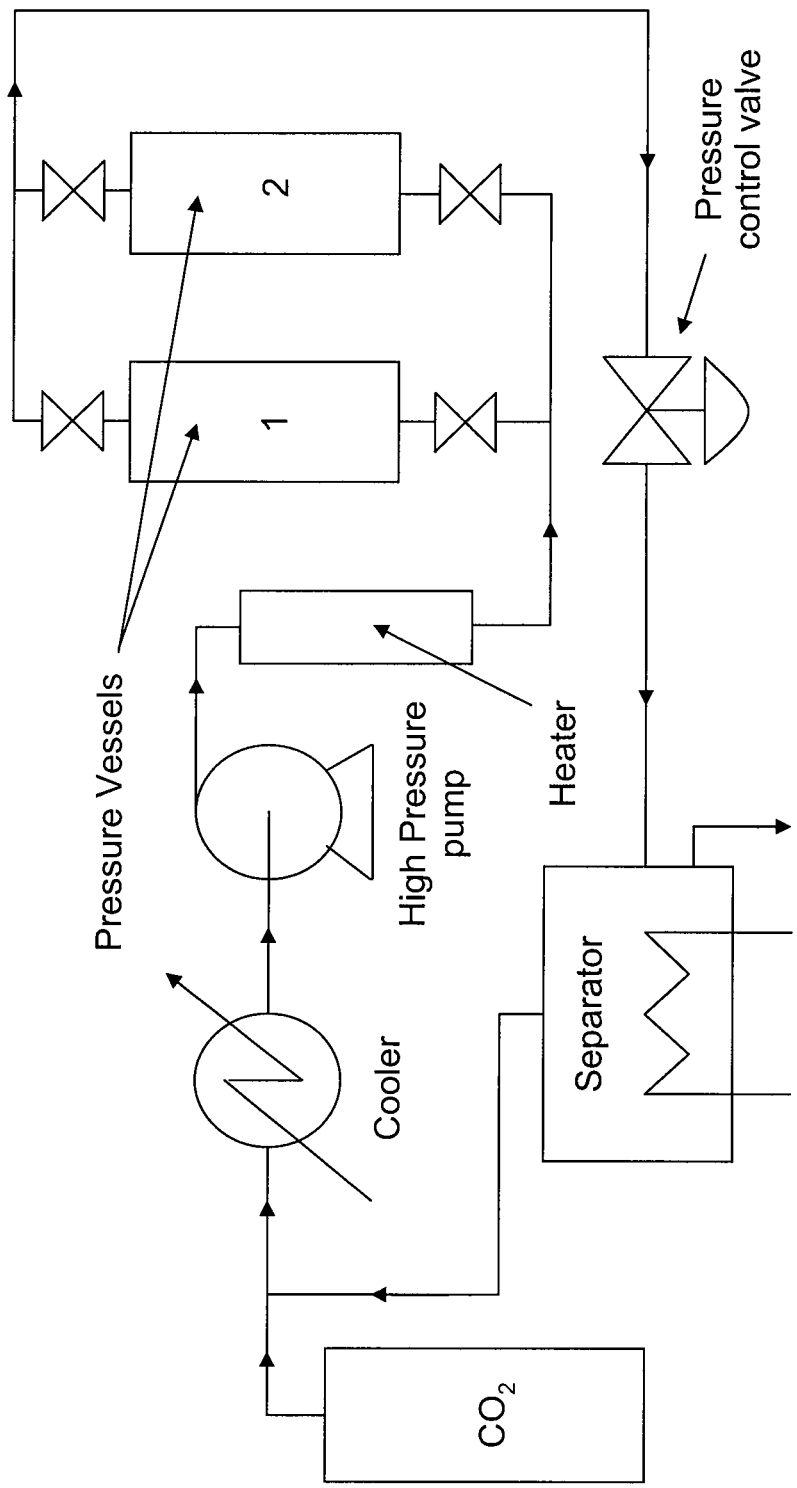
FIG. 1 is a flow diagram in accordance with one aspect of the invention.

The present invention provides foaming compositions containing entrapped supercritical fluid and methods for preparing the same for use in food and beverage products including, for example, instant cappuccino and other coffee mixes, instant refreshing beverage mixes, instant soup mixes, instant milkshake mixes, instant dessert toppings, instant sauces, hot or cold cereals, and the like. The foaming composition is prepared by entrapping a supercritical fluid within the pore structure of a porous particulate ingredient. As used herein, "pore structure" refers to a plurality of internal voids of the particulate ingredient, and "internal voids" refers to sealed internal voids, also known as closed pores, of the particulate ingredient that are not open to the surrounding atmosphere. A more detailed description of internal voids, the method used to measure internal void volume, and internal void volume ranges suitable for use with this invention are provided in U.S. Patent App. Publication Nos. 2006/0040033, 2006/0040034, and 2006/0040038, each of which is incorporated herein by reference.

According to one aspect of the invention, a method is provided for preparing a foaming composition comprising contacting a supercritical fluid having a critical temperature of at least about 10° C. with a particulate ingredient having a glass transition temperature above ambient temperature at a temperature above the glass transition temperature of the particulate ingredient, wherein the particulate ingredient comprises a plurality of internal voids; holding the particulate ingredient at the temperature above the glass transition temperature of the particulate ingredient for a period of time effective to transfer at least a portion of the supercritical fluid into the plurality of internal voids of the particulate ingredient; and reducing the temperature to below the glass transition temperature of the particulate ingredient, thereby entrapping at least a portion of the supercritical fluid in the plurality of internal voids of the particulate ingredient.

According to another aspect of the invention, a foaming composition is provided comprising a particulate ingredient having a plurality of internal voids containing entrapped supercritical fluid having a critical temperature of at least about 10° C.

According to yet another aspect of the invention, a foaming composition is prepared by a method comprising contacting a supercritical fluid having a critical temperature of at least about 10° C. with a particulate ingredient having a glass transition temperature above ambient temperature at a temperature above the glass transition temperature of the particulate ingredient, wherein the particulate ingredient comprises a plurality of internal voids; holding the particulate ingredient at the temperature above the glass transition temperature of the particulate ingredient for a period of time effective to allow transfer of the supercritical fluid into the plurality of internal voids of the particulate ingredient; and reducing the temperature to below the glass transition temperature of the particulate ingredient, thereby entrapping at least a portion of the supercritical fluid in the particulate ingredient.

The particulate ingredient should be edible and have a glass transition temperature above ambient temperatures (i.e., 0° C. or higher). Preferably the glass transition temperature is in the range of about 30° C. to about 150° C. and more preferably about 50° C. to about 130° C. Preferably the moisture content of the particulate ingredient (both before and after any supercritical fluid is entrapped in the internal voids thereof) is in the range of about 0-20% by weight, more preferably about 1-10%, and even more preferably about 2-5%. Preferably the particle size of the particulate ingredient (both before and after any supercritical fluid is entrapped in the internal voids thereof) is about 1-5000 microns, preferably about 5-2000 microns, and more preferably about 10-1000 microns. The particulate ingredient may be of various forms including carbohydrate, protein, and/or mixtures thereof. The particulate ingredient may optionally include a dispersed fat in addition to carbohydrate and/or protein.

Suitable carbohydrates include, for example, sugars (such as glucose, fructose, sucrose, lactose, mannose, and maltose), polyhydric alcohols (such as glycerol, propylene glycol, polyglycerols, and polyethylene glycols), sugar alcohols (such as sorbitol, mannitol, maltitol, lactitol, erythritol, and xylitol), oligosaccharides, polysaccharides, starch hydrolysis products (such as maltodextrins, glucose syrups, corn syrups, high-maltose syrups, and high-fructose syrups), gums (such as xanthan, alginates, carrageenans, guar, gellan, locust bean, and hydrolyzed gums), soluble fibers (such as inulin, hydrolyzed guar gum, and polydextrose), modified starches (such as physically or chemically modified starches that are soluble or dispersible in water), modified celluloses (such as methylcellulose, carboxymethyl cellulose, and hydroxypropylmethyl cellulose) and/or mixtures thereof.

Suitable proteins include, for example, milk proteins, soy proteins, egg proteins, gelatin, collagen, wheat proteins, hydrolyzed proteins (such as hydrolyzed gelatin, hydrolyzed collagen, hydrolyzed casein, hydrolyzed whey protein, hydrolyzed milk protein, hydrolyzed soy protein, hydrolyzed egg protein, hydrolyzed wheat protein, and amino acids), and/or mixtures thereof.

Suitable fats include, for example, fats, oils, hydrogenated oils, interesterified oils, phospholipids, and fatty acids derived from vegetable, dairy, or animal sources, and fractions or mixture thereof. The fat may also be selected from waxes, sterols, stanols, terpenes, and fractions or mixtures thereof.

Optionally, the particulate ingredient may be substantially carbohydrate-free and/or substantially protein-free (such as a soluble coffee powder, for example). Preferred substantially carbohydrate-free and/or substantially protein-free particulate ingredients include those described in U.S. Patent App. Publication Nos. 2006/0040033, 2006/0040034, and 2006/0040038. Examples of such particulate ingredients are set forth below in Table 1 with their respective glass transition temperatures. As used herein, the carbohydrate-free foaming compositions of this invention contain less than about 1%, preferably less than about 0.5%, and more preferably less than 0.1% carbohydrate. Especially preferred carbohydrate-free compositions of this invention are devoid of carbohydrate. The protein-free foaming compositions of this invention contain less than about 1%, preferably less than about 0.5%, and more preferably less than about 0.1% protein. Especially preferred protein-free compositions of this invention are devoid of protein.

TABLE 1

|  | Tg (° C.) |
| --- | --- |
| Substantially Protein-Free |  |
| 10 DE Maltodextrin | 65 |
| 92% 33 DE Glucose SS<br>8% Modified Food Starch | 74 |
| 92% 18 DE Maltodextrin<br>8% Modified Food Starch | 100 |
| 98.5% 33 DE Glucose SS<br>1% Polysorbate 20<br>0.5% Propylene Glycol Alginate (PGA) | 68 |

TABLE 1-continued

| | Tg (° C.) |
|---|---|
| 82% 33 DE Glucose SS | 65 |
| 8% Modified Food Starch | |
| 10% Hydrogenated Soybean Oil | |
| Substantially Carbohydrate-Free | |
| Hydrolyzed Gelatin | 70 |
| Hydrolyzed Sodium Caseinate | 69 |
| Carbohydrate-Protein Mixture | |
| 52% Lactose and 33 DE Glucose SS | 61 |
| 47% Skim Milk Powder | |
| 1% Disodium Phosphate | |
| Soluble Coffee | |
| Spray-Dried | 51 |
| Gas-Injected Spray-Dried | 74 |
| Gas-Injected Extruded | 73 |
| Freeze-Dried | 60 |

Compositions are expressed as % dry weight basis;
SS = Syrup Solids; exact proportions of ingredient components can be varied;
Tg can vary substantially and is a function of composition and moisture level; physical properties can vary greatly and are determined by processing methods and conditions used to manufacture ingredients; this list of examples is non-limiting.

Preferably, the particulate ingredient comprises an ingredient or mixture of ingredients selected such that the foaming composition structure is sufficiently strong to retain the entrapped supercritical fluid. The glass transition temperature (Tg) marks a second-order phase change characterized by transformation of the powder composition from a rigid glassy particulate solid state to a softened rubbery particulate solid state. This softened rubbery particulate solid state is clearly distinguished from a liquefied melt state (in which all heated particles would be united into a homogeneous viscous fluid). In general, gas solubilities and diffusion rates are higher in materials at or above the Tg. The Tg is dependent on chemical composition and moisture level and, in general, lower average molecular weight and/or higher moisture will lower Tg. The Tg can intentionally be raised or lowered by simply decreasing or increasing, respectively, the moisture content of the powder using any suitable method known to one skilled in the art. The Tg can be measured using established differential scanning calorimetry or thermal mechanical analysis techniques.

Additional optional ingredients include, for example, artificial sweeteners, emulsifiers, stabilizers, thickeners, flowing agents, colors, flavors, aromas, and the like. Suitable artificial sweeteners include saccharin, cyclamates, acesulfame, L-aspartyl based sweeteners such as aspartame, and mixtures of these. Suitable emulsifiers include monoglycerides, diglycerides, lecithin, diacetyl tartaric acid esters of mono-diglycerides (DATEM), stearoyl lactylates, modified food starches, polysorbates, PGA, sucrose esters, and mixtures thereof. Suitable stabilizers include dipotassium phosphate and sodium citrate. Suitable flowing agents include, for example, sodium silica aluminate, silicon dioxide, and tri-calcium phosphate.

Suitable supercritical fluids for use with the present invention may include, for example, supercritical carbon dioxide, supercritical nitrous oxide, supercritical noble gases such as xenon, supercritical halogenated hydrocarbons such as Freons, and supercritical hydrocarbons such as ethane, propane, butane, ethylene, and the like. Supercritical carbon dioxide, supercritical nitrous oxide, and supercritical noble gases are preferred. The supercritical fluid has a critical temperature of at least about 10° C., preferably in the range of about 10° C. to about 175° C., more preferably in the range of about 25° C. to about 150° C. The supercritical fluid preferably has a critical pressure in the range of about 20 atm to about 100 atm, more preferably in the range of about 30 atm to about 80 atm, and a density in the range of about 0.1 g/cc to about 1.6 g/cc, more preferably in the range of about 0.15 g/cc to about 1.4 g/cc, and most preferably in the range of about 0.2 g/cc to about 1.2 g/cc. Supercritical fluids having critical temperatures below 10° C. (e.g., $N_2$ with a critical temperature of about −147° C.) are not suitable for use with the present invention.

A supercritical fluid is a substance at a temperature and pressure above both its critical temperature and critical pressure. The combination of critical temperature and critical pressure defines the thermodynamic critical point at which the liquid state ceases to exist. As used herein, supercritical fluid refers to a gas that has reached a temperature and pressure above its thermodynamic critical point. Entrapped supercritical fluid refers to such a supercritical fluid that is present in the internal voids of a porous particulate ingredient. It is contemplated that, depending on the critical temperature and pressure of the supercritical fluid and the glass transition temperature of the particulate ingredient, the temperature and pressure required to entrap the supercritical fluid within the pore structure of the particulate ingredient may result in the supercritical fluid no longer being in a supercritical state when it is entrapped. For example, a supercritical fluid entrapped in the internal voids of a porous particulate ingredient at a temperature above the glass transition temperature of the particulate ingredient might be subsequently converted to a gas or mixture of gas and liquid when the particulate ingredient is cooled to below its glass transition temperature and the entrapped supercritical fluid is cooled to below its critical temperature. As used herein, entrapped supercritical fluid encompasses such substances as well. Table 2 provides published data for the approximate critical temperature (° C.), critical pressure (bar), critical density (g/cc), and liquid density (g/cc) for a number of suitable gases.

TABLE 2

| Gas | Critical Temperature (° C.) | Critical Pressure (bar) | Critical Density (g/cc) | Liquid Density (g/cc) |
|---|---|---|---|---|
| Carbon Dioxide | 31 | 73 | 0.46 | 1.1 |
| Nitrous Oxide | 36 | 72 | | |
| Ethane | 32 | 49 | | |
| Propane | 97 | 42 | | 0.5 |
| Butane | 152 | 38 | | 0.6 |
| Ethylene | 10 | 51 | | |
| Freon 12 | 112 | 41 | 0.56 | 1.3 |
| Freon 13 | 29 | 39 | 0.58 | 1.3 |
| Freon 22 | 96 | 49 | 0.52 | 1.2 |
| Freon 23 | 26 | 48 | 0.52 | 0.7 |
| Freon 41 | 45 | 59 | | |
| Freon 116 | 20 | 30 | 0.61 | 1.6 |
| Freon C318 | 115 | 28 | | |
| Xenon | 17 | 58 | | |

In one form, a foaming composition is prepared by entrapping a supercritical fluid within the internal voids of a particulate ingredient by passing a continuous flow of supercritical fluid through the particle bed. Preferably, the temperature of the particulate ingredient is raised above the glass transition temperature (Tg) of the particulate ingredient by direct contact with the supercritical fluid as heated supercritical fluid is passed through the particle bed. In addition, or in the alternative, the temperature of the particulate ingredient may be raised above the Tg using a variety of methods known to those skilled in the art for applying direct or indirect heat (e.g., jacket-heated mixing vessel, microwave heating, infrared ("IR") heating, and the like).

Once the temperature of the particulate ingredient is raised above the Tg, the particulate ingredient is held at a temperature above the Tg for a period of time effective to transfer at least a portion of the supercritical fluid into the plurality of internal voids of the particulate ingredient, preferably in the range of about 1 minute to about 30 minutes, more preferably, in the range of about 5 minutes to about 20 minutes. Subsequently, the temperature of the particulate ingredient is reduced to below the Tg of the particulate ingredient, preferably to at least about 10° C. below the Tg, more preferably, to at least about 20° C. below the Tg, and most preferably, to at least about 30° C. below the Tg. Preferably, the temperature of the particulate ingredient is reduced below the Tg of the particulate ingredient by direct contact with the supercritical fluid, or more preferably, with a liquid as the supercritical fluid or the liquid is passed through the particle bed at a temperature below the Tg. In addition, or in the alternative, the temperature of the particulate ingredient may be reduced below the Tg using a variety of methods known to those skilled in the art. Preferably, the particulate ingredient is cooled rapidly at a rate of greater than about 2° C./min, more preferably, at a rate of greater than about 4° C./min, even more preferably, at a rate of greater than 8° C./min, and most preferably, at a rate of greater than about 12° C. per minute. The rate of cooling refers to the average rate of cooling of the particulate ingredient from a temperature above the Tg to a temperature at least about 10° C. lower than the Tg. It is recognized that the rate of cooling of the particulate ingredient will change over the course of the cooling process as a function of the temperature difference between the particulate ingredient and the temperature of the fluid entering the particle bed. Preferably, the pressure is maintained at or above the critical pressure of the supercritical fluid throughout the process.

This process results in the supercritical fluid being entrapped inside the internal voids of the particulate ingredient. Preferably, the entrapped supercritical fluid comprises at least about 0.5 weight percent of the resulting foaming composition. When the foaming composition is included as part of a powdered or granulated food or beverage product, gas is rapidly released upon reconstitution with hot or cold water. The foaming composition preferably releases at least about 2 cc, and more preferably at least about 5 cc, gas per gram of the composition when dissolved in a liquid at ambient conditions. At ambient temperature, the pressure of the supercritical fluid entrapped inside the internal voids of the foaming composition is greater than atmospheric pressure (1 bar), preferably greater than 5 bars, more preferably greater than 10 bars, and most preferably greater than 20 bars. The rapid release of gas delivers a layer of foam similar in appearance to authentic cappuccino foam.

Foaming compositions prepared as described above have been found to provide a number of surprising advantages over conventional foaming compositions prepared by static systems, in which there is no continuous flow of fluid through the vessel while it is under pressure. More specifically, we have found that passing a continuous flow of supercritical fluid through the particle bed results in less undesirable agglomeration of the particulate ingredient than is found in conventional foaming compositions prepared in static systems. Although not wishing to be limited by theory, it is believed that passing a continuous flow of supercritical fluid inhibits particle agglomeration by minimizing the contact time between particles and by drying the particulate ingredient during the initial heating, especially of surface-absorbed moisture. We have found that particle agglomeration results in a product having an undesirably larger average particle size (i.e., greater than about 500 μm), larger bubble size, and surprisingly, relatively poor solubility. Thus, agglomerated particles must often be removed from the finished product, which results in longer processing times and wasted materials.

With reference to FIG. 1, a system is illustrated which allows for batch production of a foaming composition according to one aspect of the present invention. As illustrated, a particulate ingredient (such as a porous spray-dried powder) is loaded into a pressure vessel. Carbon dioxide is introduced into the bottom of the vessel at ambient temperature until a desired pressure is reached (preferably, greater than about 20 bar; more preferably, greater than about 50 bar). Once the desired pressure is reached, a continuous flow of supercritical carbon dioxide is introduced through the particulate ingredient. The carbon dioxide is heated to a temperature above the glass transition temperature (Tg) of the particulate ingredient before being introduced into the vessel, and the pressure in the vessel is maintained at or above the critical pressure of the supercritical carbon dioxide.

Once the temperature of the particulate ingredient in the vessel exceeds the Tg, it is held at or above that temperature for a period of time effective to transfer at least a portion of the supercritical fluid into the internal voids of the particular ingredient. Thereafter, the particulate ingredient is rapidly cooled by introducing liquid carbon dioxide at 30° C. or lower temperature, or by introducing supercritical carbon dioxide at a temperature higher than its critical point (31° C.) but lower than the glass transition temperature of the particulate ingredient, into the vessel. In general, the lower the temperature of the carbon dioxide introduced into the vessel, and the faster the rate of introduction of carbon dioxide into the vessel, the faster the cooling rate of the particulate ingredient. Once the temperature of the particulate ingredient is below about 40° C., the vessel can be depressurized and the foaming composition unloaded.

Optionally, a plurality of pressure vessels may be connected in series and/or isolated at different stages of the process to allow continuous or semi-continuous production of the foaming composition according to the invention. Such an arrangement can beneficially further reduce gas loss, raw material costs, and processing time.

In another form, at least a portion of the entrapped supercritical fluid comprises a liquefied gas, which may be in contact with a pressurized gas. This may be accomplished, for example, by quickly reducing the temperature of the supercritical fluid to below the critical temperature and maintaining a pressure at or above the critical pressure to entrap condensed liquefied gas inside the internal voids of the particulate ingredient. In such a case, the entrapped supercritical fluid may comprise a greater weight percent of the resulting foaming composition (preferably at least about 1.0 weight percent), which allows a desirably larger amount of gas to be released upon reconstitution of the foaming composition since the entrapped liquefied gas will be rapidly converted to gas when the particulate ingredient is reconstituted.

In yet another form, one or more soluble additives, including, for example, volatile flavor or aroma ingredients, water, plasticizers, botanical extracts, nutrients, and/or vitamins may be incorporated in the supercritical fluid. As a result, at least a portion of the soluble additive(s) will also be entrapped inside the internal voids of the particulate ingredient along with the supercritical fluid. In one form, for example, upon reconstitution with a liquid, the foaming composition may release a desirable burst of flavor and/or aroma in addition to releasing gas and delivering a layer of foam.

In one form, the flavor and/or aroma ingredient comprises a volatile liquid or solid component of a flavor or aroma ingredient capable of partitioning, dissolving, or dispersing, in part or in whole, into the supercritical fluid. The volatile, supercritical fluid-soluble flavor or aroma ingredient, which may be natural or synthetic in origin, is preferably comprised of at least one supercritical fluid-soluble or supercritical fluid-miscible odor-active volatile chemical component that is predominantly liquid or solid at 25° C. and atmospheric pressure in its pure form. It preferably has a boiling point below 300° C., more preferably below 200° C., and most preferably below 150° C. As used herein, boiling point refers to the temperature at which the volatile supercritical fluid-soluble flavor or aroma ingredient vaporizes or thermally decomposes at atmospheric pressure. Odor-active refers to any volatile liquid or solid component of a flavor or aroma ingredient capable of being perceived through the sense of smell. Suitable volatile, supercritical fluid-soluble flavor and aroma ingredients may include, but are not limited to, vanillin, camphene, benzyl benzoate, cinnamaldehyde, ethyl decanoate, decanal, 2-heptylfuran, nonyl acetate, ethyl octanoate, linalool, 1-octanol, heptyl acetate, benzaldehyde, d-limonene, ethyl hexanoate, myrcene, heptanal, 2-heptanone, methyl pentanoate, 2-ethylfuran, 2,3-butanedione, and mixtures thereof.

EXAMPLES

The following examples further illustrate various features of the invention, but are not intended to limit the scope of the invention as set forth in the appended claims. Unless otherwise noted, all percentages and ratios are by weight. All references cited in the present specification are hereby incorporated by reference.

Example 1

The following example demonstrates the benefits of the present invention in instant cappuccino mixes reconstituted with 150 mL of hot (88° C.) water in a 250 mL beaker having a 65 mm internal diameter.

A foaming composition was prepared according to the following procedures. First, 300 g of a porous spray-dried powder (having a mean particle size (D50) of 130 μm as measured by laser diffraction with 0%>500 μm) containing a plurality of internal voids and consisting of 92% maltodextrin and 8% sodium octenylsuccinate substituted starch (dry weight) was loaded into a 2 L stainless steel pressure vessel. This protein-free carbohydrate powder had a glass transition temperature (Tg) of about 100° C. and internal void volume of about 70 volume percent. Carbon dioxide gas was introduced into the bottom of the vessel at ambient temperature (about 22° C.) and compressed until the pressure in the vessel reached 57 bars gauge. An additional amount of carbon dioxide gas was progressively heated to a maximum temperature of about 129° C. (above its critical temperature) and introduced into the bottom of the vessel until the pressure in the vessel reached 102 bars gauge (above the critical pressure of 74 bars). Under these conditions of heating and compressing, carbon dioxide was transformed from a gas to a supercritical fluid.

Once the pressure reached 102 bars gauge, a continuous flow of supercritical carbon dioxide was initiated through the powder bed at a rate of about 10 L/h as measured at the outlet of the high pressure pump. It should be noted that the carbon dioxide was heated to a temperature above the Tg of the powder before being introduced into the vessel and the pressure in the vessel was maintained at a pressure of about 102 bars gauge (above the critical pressure of 74 bars).

Once the temperature of the powder in the vessel exceeded the Tg, the powder was held at that temperature for about 10 minutes. In this example, the time taken to pressurize the vessel and heat the powder, as measured close to the bottom of the vessel, to 101° C. was 30 minutes.

Figure 2:
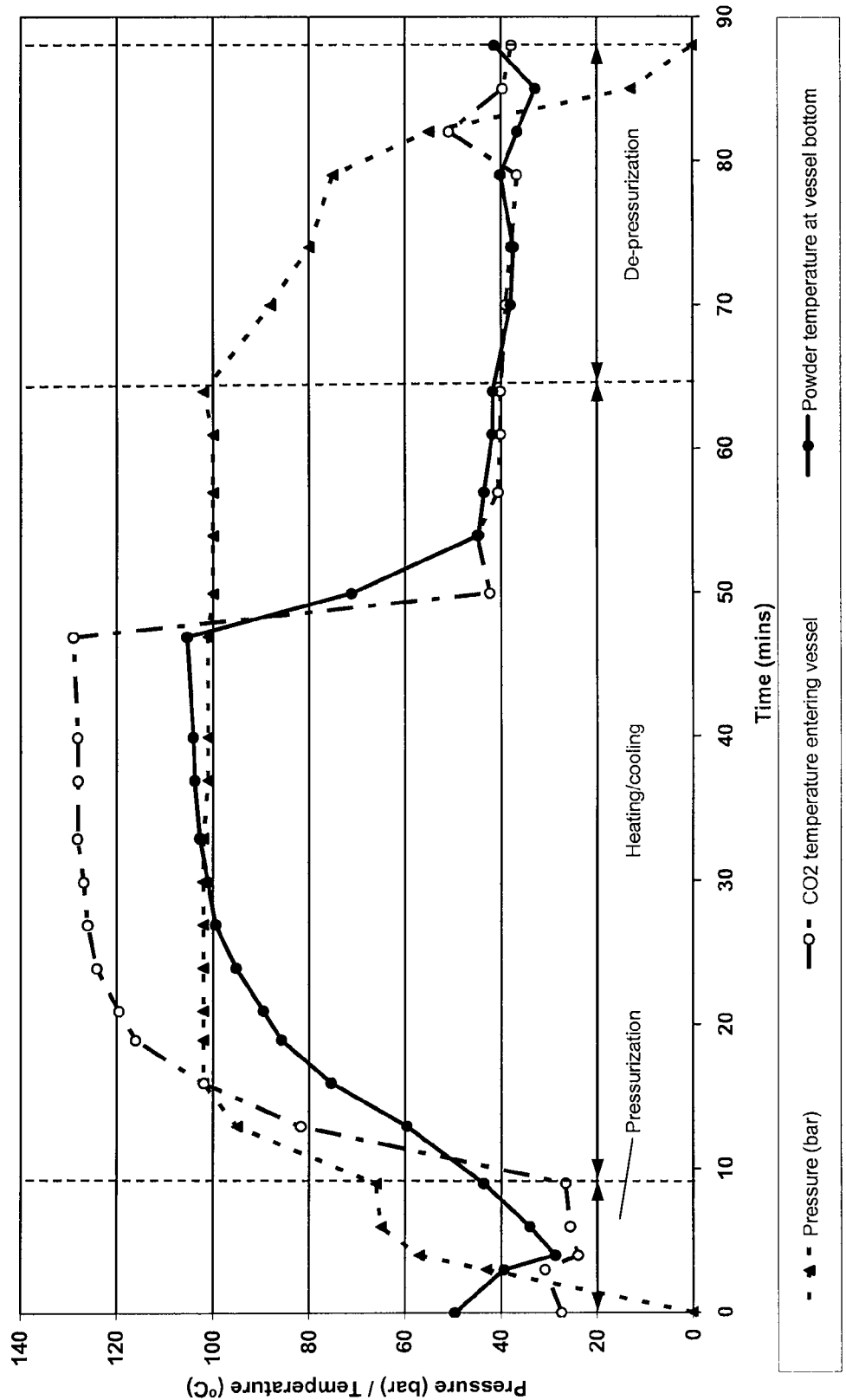
FIG. 2 is a representative time-temperature-pressure profile compiled from experimental data obtained in Example 1.
Figure 3:
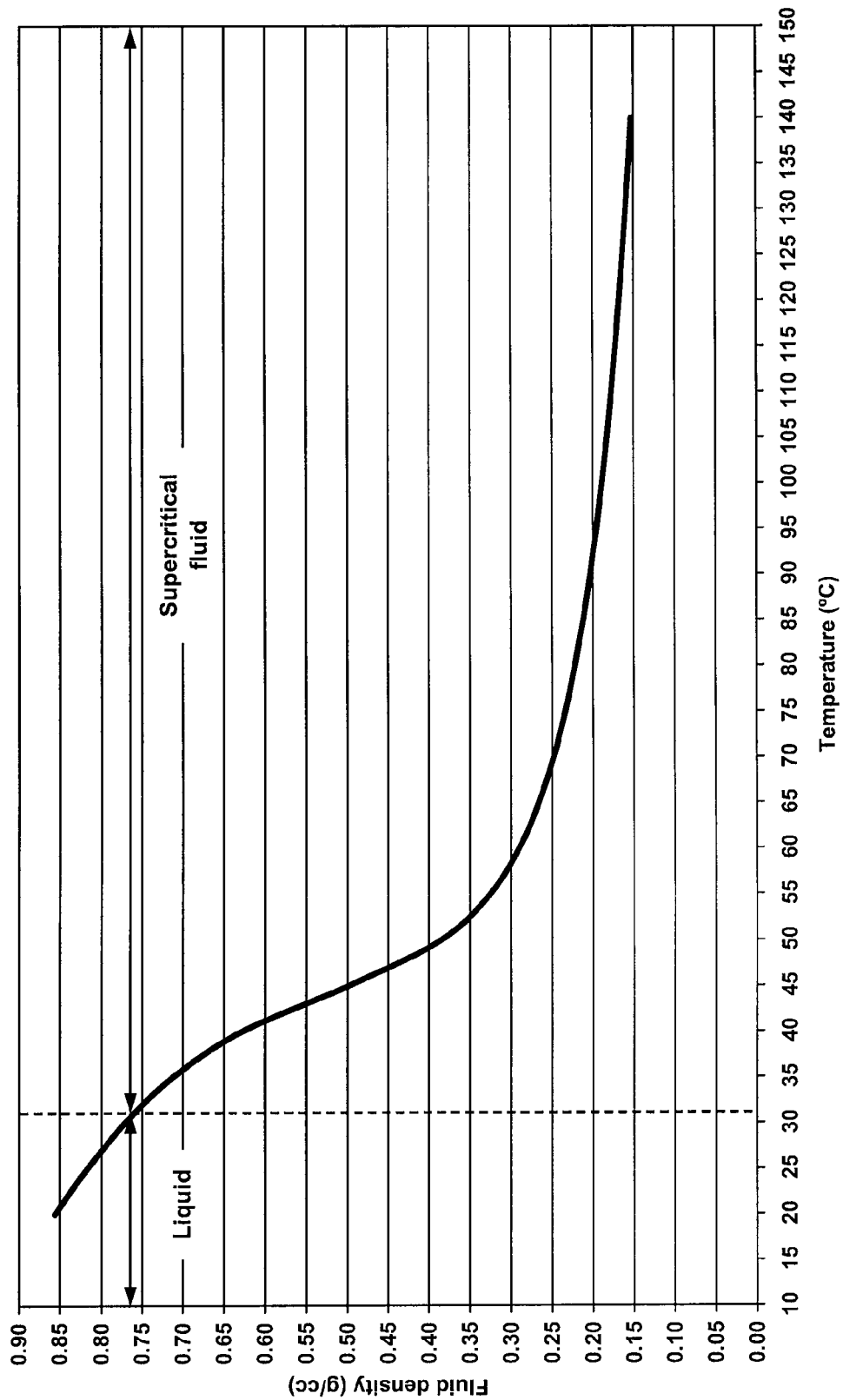
FIG. 3 is a graph showing the fluid state and fluid density of carbon dioxide as a function of temperature at a constant pressure of 100 bars gauge.

The powder was then rapidly cooled to a temperature below the Tg at a pressure of 102 bars gauge by introducing supercritical carbon dioxide at about 40° C. into the vessel at a rate of about 10 L/h. With reference to FIG. 2, in this example, overall cooling and depressurization (to about 40° C. and 0 bars gauge) took 41 minutes; the time to cool the powder, as measured close to the bottom of the vessel, from 105° C. to 71° C. was 3 minutes, and the time to cool from 105° C. to 45° C. was 7 minutes. This equates to an average cooling rate of greater than about 11° C./min from a temperature above the Tg to a temperature about 30° C. below the Tg and, therefore, an average cooling rate greater than about 11° C./min from a temperature above the Tg to a temperature about 10° C. lower than the Tg. With reference to FIG. 2, powder cooling occurred much more rapidly than powder heating because the lower-temperature (about 40° C.) supercritical carbon dioxide used to cool the powder had density (approximately 0.65 g/cc) and heat capacity greater than the higher-temperature (above powder Tg) supercritical carbon dioxide used to heat the powder. With reference to FIG. 3, the supercritical fluids at both temperatures, and at intermediate temperatures reached during heating and cooling, had density and heat capacity beneficially greater than gaseous carbon dioxide at ambient temperature. Once the temperature of the powder reached about 40° C., the vessel was depressurized and the powder was unloaded.

When 3 g of this foaming composition containing entrapped supercritical carbon dioxide was added to 11.5 g of an instant cappuccino mix comprised of soluble coffee, conventional foaming creamer powder, and sugar, and reconstituted as described above, the height of the foam (measured between the surface of the liquid and the top of the foam) was in excess of 30 mm. In contrast, the height of the foam created without addition of the pressurized powder was about 10 mm. Knowledge of the foam density and incremental foam volume was used to estimate the amount (corrected to room temperature and pressure) of gas released by the foaming composition to at least about 15 cc per gram of powder at ambient temperature (25° C.) and pressure, corresponding to an estimated gas content of at least about 2.7 weight percent. The foaming composition had an internal void volume of about 18 volume percent, corresponding to a measured internal void volume of about 0.16 cc/g.

These data indicate that if all of the entrapped supercritical carbon dioxide were present as gas within the internal voids of the foaming composition when cooled to ambient room temperature, the estimated gas pressure (95 bars at 25° C.; 93 bars at 20° C.; 90 bars at 10° C.; 87 bars at 0° C.) within the internal voids would significantly exceed the known saturated vapor pressure limit (64 bars at 25° C.; 57 bars at 20° C.; 45 bars at 10° C.; 35 bars at 0° C.) of carbon dioxide gas in contact with liquid carbon dioxide. This finding indicates a significant portion, sufficient to prevent formation of gas pressure exceeding the saturated vapor pressure limit, of entrapped supercritical carbon dioxide condensed to a liquid state within the internal voids of the foaming composition during cooling. Accordingly, this indicates a mixture of gaseous and liquefied carbon dioxide is present within the internal voids of the cooled foaming composition, even when allowing for the possibility that a small portion of carbon dioxide may be dissolved in the solid phase of the foaming composition. This beneficial result was obtained because the supercritical carbon dioxide was intentionally entrapped within the internal voids of the powder at a temperature (Tg; about 100° C.) and pressure (about 102 bars) greatly exceeding the critical temperature (31° C.) and critical pressure (74 bars) by cooling the powder to a temperature below the Tg prior to depressurizing the vessel and cooling the powder to a temperature below the critical temperature (to ambient room temperature).

The 95 bars gas pressure within the internal voids at 25° C. was estimated by dividing the foaming composition gas content (15 cc/g) by the internal void volume (0.16 cc/g) and then converting the 94 atmosphere gas pressure obtained to bar units (1 atmosphere equals 1.01325 bar). The estimated gas pressures listed for lower temperatures were obtained by applying the ideal gas law.

However, estimation methods are not needed to confirm the presence of a mixture of gaseous and liquefied carbon dioxide within the internal voids of the cooled foaming composition since, according to established theory, as the entrapped supercritical fluid is cooled to a temperature just below the critical temperature, a portion will condense to provide a liquid phase in equilibrium contact with a saturated vapor (gas) phase at a pressure just below the critical pressure. When the foaming composition is further cooled to lower temperatures, the internal void saturated vapor pressure will decrease as an increasing portion of the gas phase condenses to increase the proportion of the liquid phase in the equilibrium mixture. This cooling process will generally track the well-established gas-liquid phase boundary of the carbon dioxide phase diagram when pressure is plotted as a function of temperature. In general, the higher the pressure of supercritical fluid entrapped within the internal voids of the foaming composition prior to cooling to a temperature just below the critical temperature, the greater the portion that condenses to liquid in equilibrium with saturated vapor, and the more the temperature is further reduced to below the critical temperature, the greater the portion of saturated vapor that condenses to liquid. Accordingly, the use of relatively high supercritical fluid pressures will generally provide relatively large portions of entrapped liquefied carbon dioxide in equilibrium with gaseous carbon dioxide within the internal voids of the cooled foaming composition at temperatures below the critical temperature.

Example 2

The following example demonstrates the advantages of a continuous flow system in accordance with the present invention over a static system with respect to inhibiting undesirable particle agglomeration. A first foaming composition (Sample 1) was prepared in accordance with the procedures described above in Example 1, in which a continuous flow of supercritical carbon dioxide was introduced into the bottom of the vessel to heat and cool the powder.

Three comparison foaming compositions (Samples 2-4) were prepared in closed, or static, systems. In each comparison sample, the porous spray dried powder of Example 1 and supercritical carbon dioxide were loaded into a jacket-heated vessel. The starting pressure in each vessel was set between 36 and 64 bars, by filling the vessel with carbon dioxide from a pressurized cylinder. The vessels were then sealed and heated until the temperature was above the glass transition temperature of the powder. The maximum pressure in each vessel was 101 bars in Sample 2, 88 bars in Sample 3 and 50 bars in Sample 4.

The degree of agglomeration was determined for all four samples as the percent of product >500 µm [particle size], as determined by sieving. The results are shown in Table 3 below. Sample 1, prepared in a continuous flow system in accordance with the present invention, advantageously had effectively 0% of product >500 µm. In comparison, Samples 2-4, prepared in closed, or static, systems had, respectively, 40%, 50%, and 40% of product >500 µm. Thus, it was observed that the continuous flow system advantageously inhibited particle agglomeration.

TABLE 3

| Sample | Maximum Pressure (Bars) | Temperature | Continuous Flow/ Static | Degree of Agglomeration (% Product > 500 µm) |
|---|---|---|---|---|
| 1 | 102 | >Tg | Continuous Flow | 0 |
| 2 | 101 | >Tg | Static | 40 |
| 3 | 88 | >Tg | Static | 50 |
| 4 | 50 | >Tg | Static | 50 |

Example 3

The following example demonstrates the benefits of the present invention in an instant coffee powder and instant cappuccino mix reconstituted with 200 mL of hot (88° C.) water in a 250 mL beaker having a 65 mm internal diameter.

A foaming composition was prepared according to the following procedures. First, 1200 g of a porous spray-dried soluble coffee powder (having a mean particle size (D50) of 192 µm as measured by laser diffraction with 0%>500 µm) containing a plurality of internal voids was loaded into an 8 L stainless steel pressure vessel. This soluble coffee powder had a glass transition temperature (Tg) of about 60° C. and internal void volume of about 55 volume percent. Carbon dioxide gas was introduced into the bottom of the vessel at ambient temperature (about 22° C.) and compressed until the pressure in the vessel reached 55 bars gauge. An additional amount of carbon dioxide gas was progressively heated to a maximum temperature of about 85° C. (above its critical temperature) and introduced into the bottom of the vessel until the pressure in the vessel reached 100 bars gauge (above the critical pressure of 74 bars). Under these conditions of heating and compressing, carbon dioxide was transformed from a gas to a supercritical fluid.

Once the pressure reached 100 bars gauge, a continuous flow of supercritical carbon dioxide was initiated through the powder bed at a rate of about 10 L/h (measured at the outlet of the high pressure pump). The carbon dioxide was heated to a temperature above the Tg of the powder before being introduced into the vessel and the pressure in the vessel was maintained at a pressure of about 100 bars gauge (above the critical pressure of 74 bars).

Once the temperature of the powder in the vessel exceeded the Tg, the powder was held at that temperature for about 10 minutes. In this example, the time taken to pressurize the vessel and heat the powder, as measured near the outlet of the vessel, to a temperature of 60° C. was 50 minutes. The time needed to heat the powder to a temperature above the glass transition temperature in this example was longer than the time needed in Example 1, due to the larger quantity of powder present, and the larger size of the pressure vessel in this example relative to the rate of flow of carbon dioxide. The location at which the temperature was measured was also different from the location in Example 1 due to practical considerations. The time needed to heat the powder to above the glass transition temperature can be readily altered by one skilled in the art, by adjusting the temperature and/or rate of flow of supercritical carbon dioxide into the vessel.

Following depressurization of the vessel, the separator was emptied, and it was noted that approximately 1.3 g of a highly aromatic brown-colored aqueous substance was present. Although not wishing to be limited by theory, it is thought that this substance comprised water and aromatic components extracted from the surface of the soluble coffee powder. With reference to FIG. 1, the separator comprises a pressurized tank into which the flow of carbon dioxide from the vessel containing the soluble coffee powder is passed. Since the pressure and temperature in the separator are maintained at a pressure and temperature at which carbon dioxide can exist in both a liquid and vapor state, the carbon dioxide entering the separator is therefore separated into a liquid portion (which collects at the bottom of the separator) and a gaseous portion, which is taken from the top of the separator and subsequently condensed, heated and then passed through the vessel containing the soluble coffee powder. Any components present in the carbon dioxide stream entering the separator which are soluble in liquid carbon dioxide but not gaseous carbon dioxide, are retained in the separator.

The powder was then rapidly cooled to a temperature below the Tg at a pressure of 100 bars gauge by introducing a flow of cooled carbon dioxide at a temperature as low as 30° C. into the vessel at a rate of about 10 L/h. In this example, the carbon dioxide was cooled to below the critical temperature for carbon dioxide of 31° C., hence transforming the carbon dioxide from a supercritical fluid into a liquid form. With reference to FIG. 3, this beneficially increased the rate of cooling of the powder relative to using supercritical carbon dioxide at the same pressure (but at a temperature above the critical temperature), due to an increased temperature difference between the fluid and powder, and also since liquid carbon dioxide at the same pressure and 30° C. has a density (approximately 0.77 g/cc) and heat capacity higher than supercritical carbon dioxide at the same pressure (but at a temperature above the critical temperature). With reference to FIG. 3, the carbon dioxide used for both heating and cooling had density and heat capacity beneficially greater than gaseous carbon dioxide at ambient temperature. Once the temperature of the powder reached about 35° C., the vessel was depressurized and the powder was unloaded. In this example, the time needed to cool the powder from a temperature of 60.7° C. (above the Tg) to 49.8° C. (below the Tg) was just 5 minutes, and the time needed to cool and depressurize the vessel (to 0 bars gauge) was 26 minutes.

When 3 g of this foaming composition containing entrapped supercritical carbon dioxide was added to 8.0 g of an instant cappuccino mix comprised of conventional foaming creamer powder and sugar, and reconstituted as described above, the height of the foam (measured between the surface of the liquid and the top of the foam) was in excess of 18 mm. In contrast, the height of the foam created without addition of the pressurized powder was about 8 mm. Similarly, when 3 g of the foaming composition containing entrapped supercritical carbon dioxide was reconstituted (without the addition of any other ingredients) to provide an instant coffee beverage, the height of foam (measured between the surface of the liquid and the top of the foam) was in excess of 10 mm. In contrast, the height of foam created when the unpressurized soluble coffee powder (without entrapped supercritical carbon dioxide) was reconstituted, was just 1.5 mm. Knowledge of the foam density and incremental foam volume was used to estimate the amount (corrected to room temperature and pressure) of gas released by the foaming composition to at least about 7 cc per gram of powder at ambient temperature (25° C.) and pressure, corresponding to an estimated gas content of at least about 1.2 weight percent. The foaming composition had an internal void volume of about 9 volume percent, corresponding to a measured internal void volume of about 0.07 cc/g.

When applying the same calculations as in Example 1, in order to determine the pressure of entrapped supercritical fluid present within the internal voids of the cooled foaming composition, the data indicate that a mixture of gaseous and liquefied carbon dioxide is present within the internal voids of the powder in this example, with a slightly greater proportion of liquefied carbon dioxide present than in the internal voids of the powder comprising the foaming composition of Example 1.

What is claimed is:

1. A method for preparing a foaming composition comprising:
    contacting a continuous flow of a supercritical fluid with a particulate ingredient having a glass transition temperature above ambient temperature at a temperature above the glass transition temperature of the particulate ingredient, wherein the supercritical fluid is carbon dioxide, nitrous oxide, or a halogenated hydrocarbon, wherein the supercritical fluid has a critical temperature of at least about 10° C., and wherein the particulate ingredient comprises a plurality of internal voids;
    holding the particulate ingredient at the temperature above the glass transition temperature of the particulate ingredient for a period of time effective to allow transfer of the supercritical fluid into the plurality of internal voids of the particulate ingredient;
    reducing the temperature to below the glass transition temperature of the particulate ingredient, thereby entrapping at least a portion of the supercritical fluid in the plurality of internal voids of the particulate ingredient; and
    further reducing the temperature to below the critical temperature such that the entrapped supercritical fluid forms a mixture of gas and liquefied gas in the plurality of internal voids of the particulate ingredient.

2. The method of claim 1 further comprising:
    raising the temperature of the supercritical fluid to raise the temperature of the particulate ingredient above the glass transition temperature of the particulate ingredient; and
    reducing the temperature of the supercritical fluid to reduce the temperature of the particulate ingredient below the glass transition temperature of the particulate ingredient.

3. The method of claim 1 wherein the supercritical fluid has a density in the range of about 0.1 g/cc to about 1.6 g/cc.

4. The method of claim 1 wherein the entrapped mixture of gas and liquefied gas comprises at least about 0.5 weight percent of the foaming composition.

5. The method of claim 1 further comprising:
    incorporating at least one additive soluble in the supercritical fluid.

6. The method of claim 1 wherein the particulate ingredient comprises at least one of a substantially carbohydrate-free powder, a substantially protein-free powder, and a soluble coffee powder.

7. The method of claim 1, wherein the contacting a continuous flow of a supercritical fluid with a particulate ingredient is effective to inhibit particle agglomeration in the particulate ingredient having the mixture of gas and liquefied gas in the plurality of internal voids.

8. A foaming composition comprising:
a particulate ingredient having a glass transition temperature above ambient temperature and having a plurality of internal voids containing a mixture of gas and liquefied gas entrapped in the internal voids.

9. The foaming composition of claim 8 wherein the supercritical fluid has a density in the range of about 0.1 g/cc to about 1.6 g/cc.

10. The foaming composition of claim 8 wherein the entrapped mixture of gas and liquefied gas comprises at least about 0.5 weight percent of the foaming composition.

11. The foaming composition of claim 8 wherein at least one soluble additive is incorporated in the supercritical fluid.

12. The foaming composition of claim 8 wherein the particulate ingredient has a glass transition temperature of at least about 30° C. and comprises at least one of a substantially carbohydrate-free powder, a substantially protein-free powder, and a soluble coffee powder.

13. The foaming composition of claim 8, wherein the particulate ingredient having been exposed to a continuous flow of the supercritical fluid is effective to inhibit particle agglomeration in the particulate ingredient having the mixture of gas and liquefied gas in the plurality of internal voids.

14. A foaming composition prepared by a method comprising:
contacting a continuous flow of a supercritical fluid with a particulate ingredient having a glass transition temperature above ambient temperature at a temperature above the glass transition temperature of the particulate ingredient, wherein the supercritical fluid is carbon dioxide, nitrous oxide, or a halogenated hydrocarbon, wherein the supercritical fluid has a critical temperature of at least about 10° C., and wherein the particulate ingredient comprises a plurality of internal voids;
holding the particulate ingredient at the temperature above the glass transition temperature of the particulate ingredient for a period of time effective to allow transfer of the supercritical fluid into the plurality of internal voids of the particulate ingredient;
reducing the temperature to below the glass transition temperature of the particulate ingredient, thereby entrapping at least a portion of the supercritical fluid in the plurality of internal voids of the particulate ingredient; and
further reducing the temperature to below the critical temperature such that the entrapped supercritical fluid forms a mixture of gas and liquefied gas in the plurality of internal voids of the particulate ingredient.

15. The foaming composition of claim 14, wherein the method further comprises:
raising the temperature of the supercritical fluid to raise the temperature of the particulate ingredient above the glass transition temperature of the particulate ingredient; and
reducing the temperature of the supercritical fluid to reduce the temperature of the particulate ingredient below the glass transition temperature of the particulate ingredient.

16. The foaming composition of claim 14 wherein the supercritical fluid has a density in the range of about 0.1 g/cc to about 1.6 g/cc.

17. The foaming composition of claim 14 wherein the entrapped mixture of gas and liquefied gas comprises at least about 0.5 weight percent of the foaming composition.

18. The foaming composition of claim 14 wherein at least one soluble additive is incorporated in the supercritical fluid.

19. The foaming composition of claim 14 wherein the particulate ingredient comprises at least one of a substantially carbohydrate-free powder, a substantially protein-free powder, and a soluble coffee powder.

20. The foaming composition of claim 14, wherein the contacting a continuous flow of a supercritical fluid with a particulate ingredient is effective to inhibit particle agglomeration in the particulate ingredient having the mixture of gas and liquefied gas in the plurality of internal voids.

21. A method for preparing a foaming composition comprising:
contacting a continuous flow of supercritical carbon dioxide with a particulate ingredient having a glass transition temperature above ambient temperature at a temperature above the glass transition temperature of the particulate ingredient, wherein the particulate ingredient comprises a plurality of internal voids;
holding the particulate ingredient at the temperature above the glass transition temperature of the particulate ingredient for a period of time effective to allow transfer of the supercritical carbon dioxide into the plurality of internal voids of the particulate ingredient;
reducing the temperature to below the glass transition temperature of the particulate ingredient, thereby entrapping at least a portion of the supercritical carbon dioxide in the plurality of internal voids of the particulate ingredient; and
further reducing the temperature to below the critical temperature such that the entrapped supercritical fluid forms a mixture of gas and liquefied gas in the plurality of internal voids of the particulate ingredient.

* * * * *